US012674301B2

(12) United States Patent　　(10) Patent No.:　US 12,674,301 B2
Hirose　　(45) Date of Patent:　Jul. 7, 2026

(54) REMOTE OPERATION ASSISTANCE SERVER, REMOTE OPERATION ASSISTANCE SYSTEM, AND REMOTE OPERATION ASSISTANCE METHOD

(71) Applicant: KOBELCO CONSTRUCTION MACHINERY CO., LTD., Hiroshima (JP)

(72) Inventor: Ryuichi Hirose, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 182 days.

(21) Appl. No.: 17/791,746

(22) PCT Filed: Jan. 7, 2021

(86) PCT No.: PCT/JP2021/000414
§ 371 (c)(1),
(2) Date: Jul. 8, 2022

(87) PCT Pub. No.: WO2021/166477
PCT Pub. Date: Aug. 26, 2021

(65) Prior Publication Data
US 2023/0031436 A1　Feb. 2, 2023

(30) Foreign Application Priority Data

Feb. 18, 2020　(JP) ................................. 2020-025723

(51) Int. Cl.
*E02F 9/20*　　(2006.01)
*B60N 2/00*　　(2006.01)
(Continued)
(52) U.S. Cl.
CPC ............ *E02F 9/205* (2013.01); *B60N 2/0021* (2023.08); *B60N 2/003* (2023.08); *E02F 9/265* (2013.01);
(Continued)

(58) Field of Classification Search
CPC ......... E02F 9/205; E02F 9/265; E02F 9/2066; E02F 9/24; E02F 3/435; E02F 9/2033;
(Continued)

(56) References Cited

U.S. PATENT DOCUMENTS 6,923,285　B1　8/2005　Rossow et al.
2008/0191524　A1*　8/2008　Takai ..................... B60N 2/002
297/217.2
(Continued)

FOREIGN PATENT DOCUMENTS

DE　　102009039767 A1　　4/2010
EP　　　1 591 647 A1　　11/2005
(Continued)

OTHER PUBLICATIONS

The extended European Search Report dated Jul. 26, 2023 issued in the corresponding EP Patent Application 21756623.1.
(Continued)

*Primary Examiner* — Hitesh Patel
*Assistant Examiner* — Ashley Nicole Turnbaugh
(74) *Attorney, Agent, or Firm* — Carrier, Shende & Associates P.C.; Joseph P. Carrier; Jeffrey T. Gedeon

(57)　　　　　ABSTRACT

There is provided a technology capable of improving work efficiency of a work machine that is remotely operated by an operator through a remote operation apparatus. If a first condition is satisfied, that is, if an engine stop instruction for a work machine 40 is made through a remote input interface 21 of the remote operation apparatus 20, operation of an engine 460 is stopped in principle, but the operation of the engine 460 is exceptionally not stopped. Specifically, when an operator exists at a specified position at the time of operating a remote operation mechanism 211 in the remote operation apparatus 20, the operation of the engine 460 is stopped. On the other hand, when the operator does not exist (Continued)

at the specified position, the operation of the engine 460 is continued without being stopped even if an engine operation instruction is made.

5 Claims, 6 Drawing Sheets

(51) Int. Cl.
*E02F 9/26* (2006.01)
*G05D 1/00* (2024.01)
*G06V 20/59* (2022.01)
*G06V 40/16* (2022.01)

(52) U.S. Cl.
CPC ......... *G05D 1/0022* (2013.01); *G05D 1/0077* (2013.01); *G06V 20/593* (2022.01); *G06V 40/172* (2022.01); *G06V 40/174* (2022.01); *B60N 2210/22* (2023.08); *B60N 2210/42* (2023.08); *B60N 2230/20* (2023.08)

(58) Field of Classification Search
CPC ....... E02F 9/268; B60N 2/002; G05D 1/0022; G05D 1/0077; G06V 20/593; G06V 40/172; G06V 40/174; H04Q 9/00
USPC .......................................................... 701/50
See application file for complete search history.

(56) References Cited

U.S. PATENT DOCUMENTS

| | | | | |
|---|---|---|---|---|
| 2010/0057332 | A1* | 3/2010 | Katoh ................. | F02N 11/0803 |
| | | | | 701/113 |
| 2018/0238024 | A1* | 8/2018 | Takigawa ................ | F02D 29/06 |
| 2018/0272978 | A1* | 9/2018 | Raphael ................. | G06V 40/16 |
| 2018/0335784 | A1* | 11/2018 | Wei ........................ | G05D 1/0011 |
| 2019/0322242 | A1* | 10/2019 | Koike ................ | G07C 9/00309 |
| 2020/0218249 | A1* | 7/2020 | Sannodo .............. | G05D 1/0016 |
| 2021/0174554 | A1* | 6/2021 | Ding ......................... | B60P 1/04 |

FOREIGN PATENT DOCUMENTS

| | | | | |
|---|---|---|---|---|
| JP | 2006-233615 | A | 9/2006 | |
| JP | 2008-248627 | A | 10/2008 | |
| JP | 2011-208568 | A | 10/2011 | |
| JP | 2012-241339 | A | 12/2012 | |
| JP | 2013-064332 | A | 4/2013 | |
| JP | 2015192163 | A * | 11/2015 | .............. E02F 9/205 |

OTHER PUBLICATIONS

Office Action dated Apr. 25, 2024 issued in the corresponding Chinese Patent Application No. 202180013659.9 with the English machine translation thereof.

* cited by examiner

FIG.6

REMOTE OPERATION ASSISTANCE SERVER, REMOTE OPERATION ASSISTANCE SYSTEM, AND REMOTE OPERATION ASSISTANCE METHOD

TECHNICAL FIELD

The present invention relates to a technology for assisting a remote operation of a work machine through a remote operation apparatus by an operator.

BACKGROUND ART

There is proposed a work machine operation circuit capable of preventing, in a work machine such as a hydraulic excavator, a malfunction after a gate lock lever is operated to release shutoff by an operation stop device (see, for example, Patent Literature 1).

There is proposed a construction machine emergency stop system capable of grasping a situation of a machine and determining whether or not it is an emergency shutoff even at emergency stop (see, for example, Patent Literature 2). According to this system, power is supplied to each piece of electronic equipment if an ignition switch is in a closed state. Further, a second piece of electronic equipment is capable of making a work machine stop instruction to cause a work machine stop unit to stop operation of a work machine and an engine stop instruction to cause a first piece of electronic equipment to stop its engine in a state in which power is supplied to each piece of electronic equipment.

There is proposed a novel work machine remote manipulation system capable of, when an abnormality occurs in a communication unit, quickly and easily identifying a position where the abnormality has occurred (see, for example, Patent Literature 3). According to this system, if a piece of equipment for which it is diagnosed that an abnormality has occurred is a piece of equipment that does not influence operations of a hydraulic system and an engine system, the work machine is controlled to be into a stand-by state. Therefore, if the piece of equipment is a piece of video/audio equipment, such a situation that an operator operates the work machine in a state of not being able to see video is avoided. Furthermore, when the stand-by state continues for a predetermined time, the engine of the work machine is stopped, so it is avoided that an unexpected situation occurs in a state that there is a possibility that the stand-by state continues for a long time.

CITATION LIST

Patent Literature

Patent Literature 1: Japanese Patent Laid-Open No. 2006-233615

Patent Literature 2: Japanese Patent Laid-Open No. 2008-248627

Patent Literature 3: Japanese Patent Laid-Open No. 2015-192163

SUMMARY OF INVENTION

Technical Problem

However, if an engine stop instruction is made for an unexpected reason, and the engine of a work machine is stopped even if an operator has an intention to continue a remote operation of the work machine, it is necessary for the operator to restart the engine, and there is a possibility that work efficiency is reduced accordingly.

Therefore, an object of the present invention is to provide a technology capable of improving work efficiency of a work machine that is remotely operated by an operator through a remote operation apparatus.

Solution to Problem

A remote operation assistance server of the present invention comprises: a first assistance processing element which, based on communication with a remote operation apparatus for remotely operating a work machine, recognizes satisfiability of each of a first condition that an engine stop instruction for the work machine has been made through an input interface of the remote operation apparatus and a second condition that a probability of an intention of an operator of the remote operation apparatus to cause an engine of the work machine to stop being reflected on the engine stop instruction is high; and a second assistance processing element which, if it is recognized by the first assistance processing element that the first and second conditions are satisfied, executes first stop processing for causing operation of a work mechanism to stop without causing operation of the engine of the work machine to stop, based on communication with the work machine, and, if it is recognized by the first assistance processing element that the first condition is satisfied but the second condition is not satisfied, executes second stop processing for causing the operation of each of the work mechanism and the engine of the work machine to stop, based on communication with the work machine According to the remote operation assistance server in the above configuration, if the first condition is satisfied, that is, if the engine stop instruction for the work machine has been made through the input interface of the remote operation apparatus, the operation of the engine is stopped in principle, but the operation of the engine is exceptionally not stopped.

Specifically, if the second condition is not satisfied, that is, if the probability of the operator's intention to cause the engine to stop and, therefore, the operator's intention to interrupt the remote operation being reflected on the engine stop instruction is high, the operation of the engine is stopped according to the engine stop instruction. Thereby, such a situation is certainly avoided that the operation stop state of the work mechanism is accidentally released by a third person other than the operator, and work by the work machine is resumed.

On the other hand, if the second condition is satisfied, that is, if the probability of the operator's intention to cause the engine to stop and, therefore, the operator's intention to interrupt the remote operation being reflected on the engine stop instruction is low, the operation of the engine is continued without being stopped even though the engine stop operation instruction is made. Thereby, the operation stop state of the work mechanism is released by the operator in that state, and the work by the work machine can be quickly resumed. Thus, efficiency of work using the work machine can be improved.

BRIEF DESCRIPTION OF DRAWINGS

FIG. 6 is a diagram about a work environment image.

DESCRIPTION OF EMBODIMENTS (Configuration of Remote Operation Assistance System)

Figure 1:
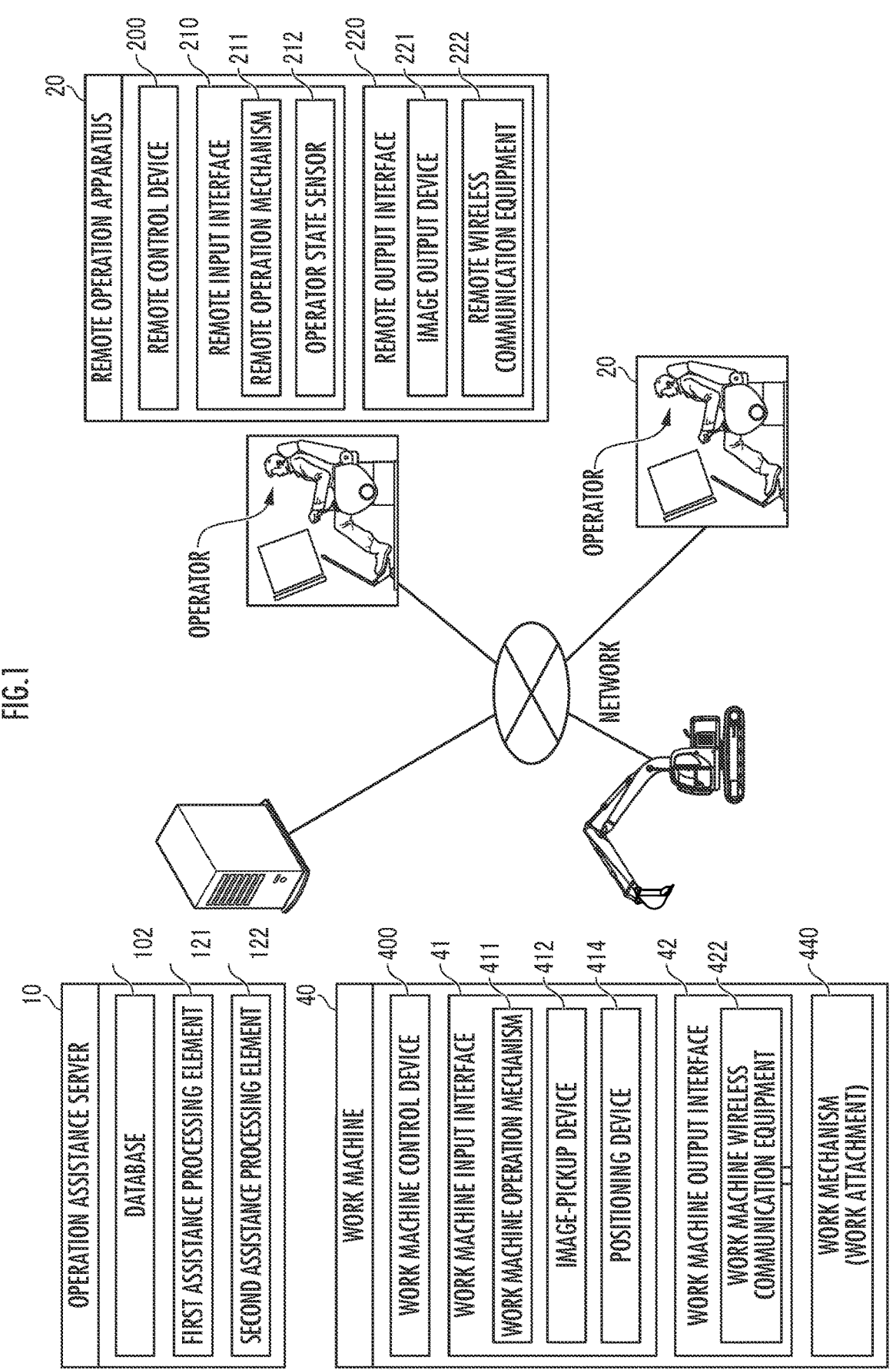
FIG. 1 is a diagram about a configuration of a remote operation assistance system as an embodiment of the present invention.

A remote operation assistance system as an embodiment of the present invention shown in FIG. 1 comprises a remote operation assistance server 10 and a work machine 40. A remote operation apparatus 20 (a client) for performing a remote operation of the work machine 40 may be a component of the remote operation assistance system. The remote operation assistance server 10, the remote operation apparatus 20 and the work machine 40 are configured to be capable of mutually performing network communication. A mutual communication network between the remote operation assistance server 10 and the remote operation apparatus 20 and a mutual communication network between the remote operation assistance server 10 and the work machine 40 may be the same or may be different (Configuration of Remote Operation Assistance Server)

The remote operation assistance server 10 comprises a database 102, a first assistance processing element 121 and a second assistance processing element 122. The database 102 stores and holds picked-up image data and the like. The database 102 may be constituted by a database server separate from the remote operation assistance server 10. Each assistance processing element is constituted by an arithmetic processing device (a single-core processor, a multi-core processor or a processor core constituting the multi-core processor), and reads necessary data and software from a storage device such as a memory and executes arithmetic processing described later according to the software for the data. The remote operation assistance server 10 may be constituted by the remote operation apparatus 20. In this case, a remote control device 200 comprises the first assistance processing element 121 and the second assistance processing element 122.

(Configuration of Remote Operation Apparatus)

The remote operation apparatus 20 comprises the remote control device 200, a remote input interface 210 and a remote output interface 220. The remote operation apparatus 20 functions as at least one of "a first client" and "a second client". The remote control device 200 is constituted by an arithmetic processing device (a single-core processor, a multi-core processor or a processor core constituting the multi-core processor), and reads necessary data and software from a storage device such as a memory and executes arithmetic processing according to the software for the data. The remote input interface 210 comprises a remote operation mechanism 211 and an operator state sensor 212. The remote output interface 220 comprises an image output device 221 and remote wireless communication equipment 222.

The remote operation mechanism 211 includes a travel operation device, a turning operation device, a boom operation device, an arm operation device and a bucket operation device. Each operation device has an operation lever to receive a rotation operation. The operation lever of the travel operation device (a travel lever) is operated to move a lower travel body 410 of the work machine 40. The travel lever may also serve as a travel pedal. For example, a travel pedal fixed to the base or lower end part of the travel lever may be provided. The operation lever of the turning operation device (a turning lever) is operated to move a hydraulic turning motor constituting a turning mechanism 430 of the work machine 40. The operation lever of the boom operation device (a boom lever) is operated to move a boom cylinder 442 of the work machine 40. The operation lever of the arm operation device (an arm lever) is operated to move an arm cylinder 444 of the work machine 40. The operation lever of the bucket operation device (a bucket lever) is operated to move a bucket cylinder 446 of the work machine 40.

Figure 2:
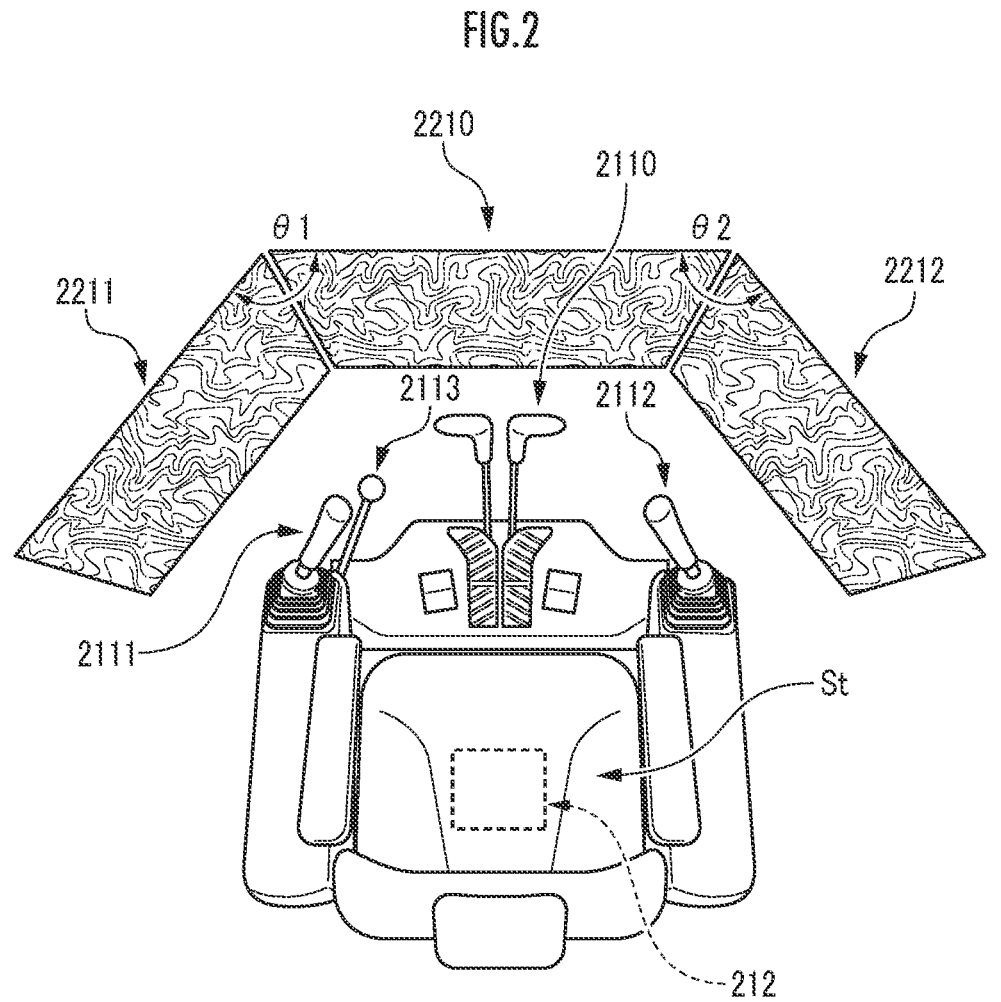
FIG. 2 is a diagram about a configuration of a remote operation apparatus.

The operation levers constituting the remote operation mechanism 211 are arranged, for example, around a seat St for an operator to be seated as shown in FIG. 2. Though the seat St is in a form like a high back chair with armrests, it may be a seating part in an arbitrary form on which an operator can sit, such as a form like a low back chair without a headrest or a form like a chair without a backrest.

In front of the seat St, a pair of left and right travel levers 2110 corresponding to left and right crawlers are arranged left and right, side by side. One operation lever may serve as a plurality of operation levers. For example, a left-side operation lever 2111 provided in front of a left-side frame of the seat St shown in FIG. 2 may function as an arm lever when operated in a front/back direction and function as a turning lever when operated in a left-right direction. Similarly, a right-side operation lever 2112 provided in front of a right-side frame of the seat St shown in FIG. 2 may function as a boom lever when operated in the front/back direction and function as a bucket lever when operated in the left-right direction. The lever patterns may be arbitrarily changed by an operation instruction by an operator.

A shutoff lever 2113 provided below the left-side operation lever 2111 in front of the left-side frame of the seat St functions as an operation lever for, when being raised, locking the work machine 40 so that the work machine 40 does not move even if each of the operation levers 2110, 2111 and 2112 is operated and, when being lowered, releasing the lock.

In the present embodiment, the operator state sensor 212 comprises a load sensor (for example, a strain gauge) provided on a part of the seat St (for example, the seating part, an armrest or the backrest) or on a support member of the seat St. It can be determined whether an operator is seated on or away from the seat St according to whether a load detected by the load sensor is large or small or whether there is a load or not. In addition, the operator state sensor 212 may comprise contact sensors or load sensors provided on at least a part of the operation levers constituting the remote operation mechanism 211. The operator state sensor 212 may comprise an image pickup sensor for recognizing the face or facial expression of a person who is seated on the seat St.

For example, as shown in FIG. 2, the image output device 221 comprises a central image output device 2210, a left-side image output device 2211 and a right-side image output device 2212 that are arranged in front of, diagonally forward left of and diagonally forward right of the seat St, respectively, each of the image output devices having an almost rectangular-shaped screen. The shapes and sizes of the screens (image display areas) of the central image output device 2210, the left-side image output device 2211 and the right-side image output device 2212 may be the same or may be different.

As shown in FIG. 2, the right edge of the left-side image output device 2211 adjoins the left edge of the central image output device 2210 such that the screen of the central image output device 2210 and the screen of the left-side image output device 2211 form a tilt angle θ1 (for example, 120°≤θ1≤150°). As shown in FIG. 2, the left edge of the right-side image output device 2212 adjoins the right edge of the central image output device 2210 such that the screen of the central image output device 2210 and the screen of the right-side image output device 2212 form a tilt angle θ2 (for example, 120°≤θ2≤150°). The tilt angles θ1 and θ2 may be the same or different.

Each of the screens of the central image output device 2210, the left-side image output device 2211 and the right-side image output device 2212 may be parallel to the vertical direction or may be inclined relative to the vertical direction. At least one image output device among the central image output device 2210, the left-side image output device 2211 and the right-side image output device 2212 may comprise a plurality of divided image output devices. For example, the central image output device 2210 may comprise a pair of image output devices that vertically adjoin each other, each of the image output devices having an almost rectangular-shaped screen. Each of the image output devices 2210 to 2212 may further comprise a speaker (a voice output device).

(Configuration of Work Machine)

The work machine 40 comprises a work machine control device 400, a work machine input interface 41, a work machine output interface 42, a work mechanism 440 and an engine 460. The work machine control device 400 is constituted by an arithmetic processing device (a single-core processor, a multi-core processor or a processor core constituting the multi-core processor), and reads necessary data and software from a storage device such as a memory and executes arithmetic processing according to the software for the data.

Figure 3:
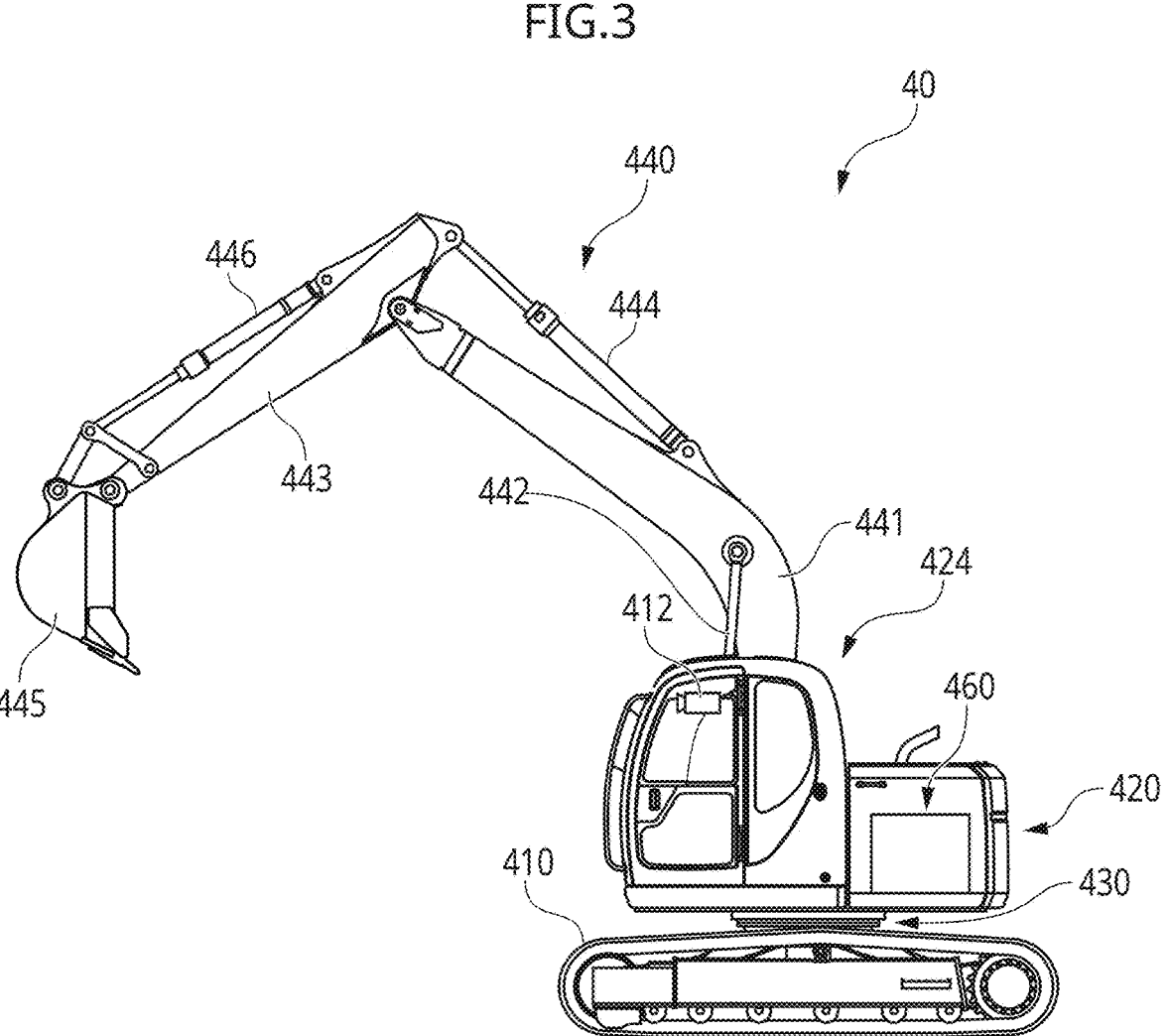
FIG. 3 is a diagram about a configuration of a work machine.

The work machine 40 is, for example, a crawler shovel (a construction machine) and comprises the crawler-type lower travel body 410, an upper turning body 420 that is turnably mounted on the lower travel body 410 via the turning mechanism 430 as shown in FIG. 3. On the front left side part of the upper turning body 420, a cab 424 (a driving room) is provided. On the front center part of the upper turning body 420, the work mechanism 440 is provided.

The work machine input interface 41 comprises a work machine operation mechanism 411, a work machine image-pickup device 412 and a positioning device 414. The work machine operation mechanism 411 comprises a plurality of operation levers arranged similarly to those of the remote operation mechanism 211 around a seat arranged inside the cab 424. A driving mechanism or a robot that receives a signal corresponding to an operation aspect of a remote operation lever and moves a work machine operation lever based on the received signal is provided in the cab 424. The work machine image-pickup device 412 is installed, for example, inside the cab 424 and picks up an image of an environment that includes at least a part of the work mechanism 440 through a front window and a pair of left and right side windows. A part or all of the front window and the side windows may be omitted. The positioning device 414 comprises a GPS, and, as necessary, a gyro sensor and the like.

The work machine output interface 42 comprises work machine wireless communication equipment 422.

The work mechanism 440 comprises a boom 441 fitted to the upper turning body 420 in a manner of being capable of being raised and fallen, an arm 443 rotatably coupled with the tip of the boom 441 and a bucket 445 rotatably coupled with the tip of the arm 443. To the work mechanism 440, the boom cylinder 442, the arm cylinder 444 and the bucket cylinder 446 that comprise telescopic hydraulic cylinders are fitted.

The boom cylinder 442 is interposed between the boom 441 and the upper turning body 420 so as to, by extending and retracting by receiving supply of hydraulic oil, cause the boom 441 to rotate in a direction of being raised and fallen. The arm cylinder 444 is interposed between the arm 443 and the boom 441 so as to, by extending and retracting by receiving supply of hydraulic oil, cause the arm 443 to rotate around a horizontal axis relative to the boom 441. The bucket cylinder 446 is interposed between the bucket 445 and the arm 443 so as to, by extending and retracting by receiving supply of hydraulic oil, cause the bucket 445 to rotate around a horizontal axis relative to the arm 443.

In a state in which the engine 460 is ON, hydraulic oil can be supplied from a main pump to a plurality of direction control valves, and primary pressure oil can be supplied from a pilot pump to the work machine operation mechanism 411. By secondary pressure oil being supplied to a direction control valve according to a movement corresponding to a remote operation instruction of the work machine operation mechanism 411 and hydraulic oil being supplied to a hydraulic cylinder corresponding to operation of the direction control valve, the turning mechanism 430 and the work mechanism 440 operate.

(First Function)

A first function of the remote operation assistance system in the above configuration will be described using a flowchart shown in FIG. 4. In the flowchart, each block indicated by "C•" is used to simplify description, means transmission and/or reception of data and means such a conditional branch that processing in a branch direction is executed on condition of transmission and/or reception of the data.

Figure 4:
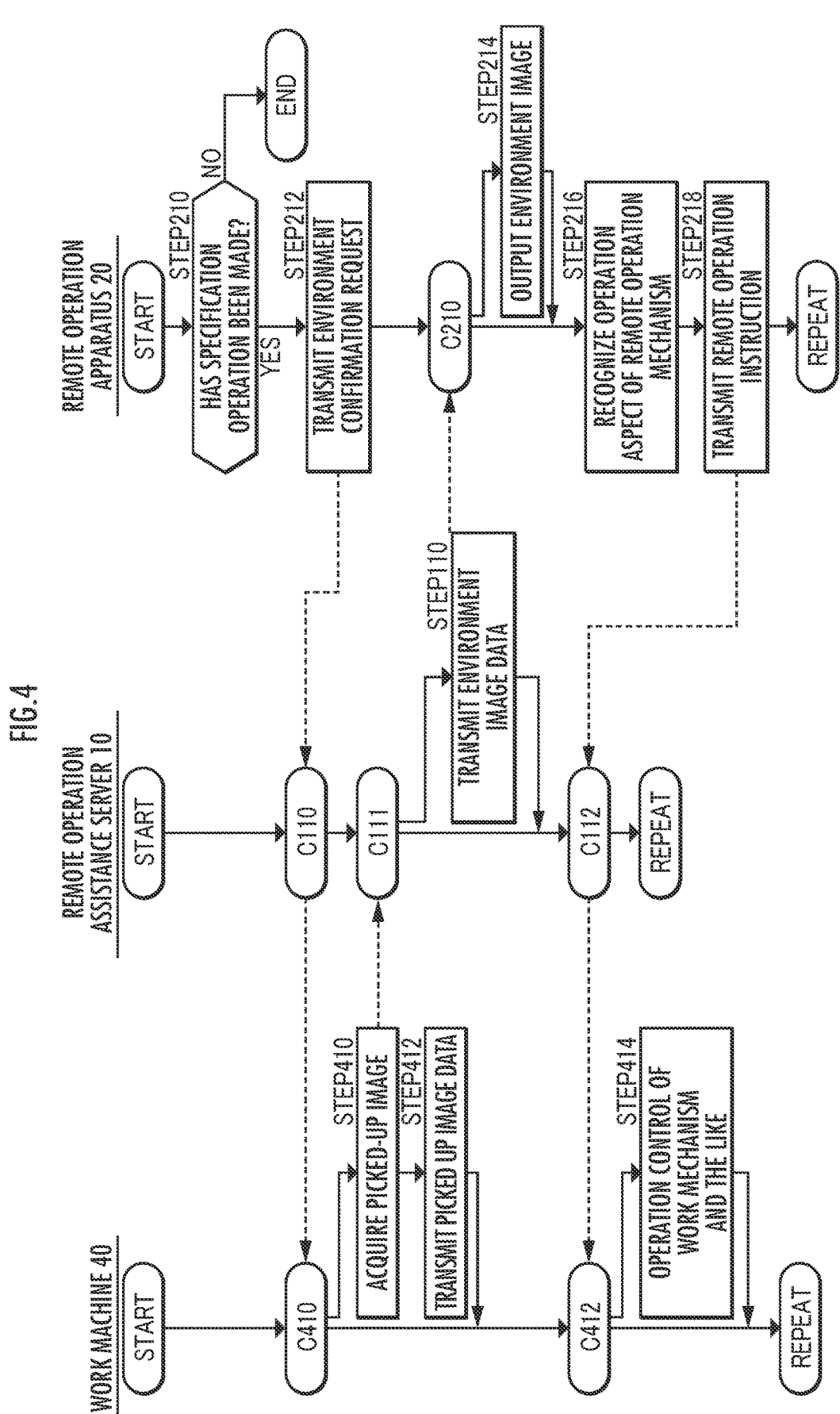
FIG. 4 is a diagram about a first function of the remote operation assistance system.

In the remote operation apparatus 20, it is determined whether a specification operation through the remote input interface 210 by an operator has been performed or not (FIG. 4/STEP 210). The "specification operation" is, for example, an operation such as tapping on the remote input interface 210 for specifying the work machine 40 that the operator intends to remotely operate. If a result of the determination is negative (FIG. 4/STEP 210: NO), a process after the determination about whether the specification operation has been performed or not is repeated. On the other hand, if the result of the determination is positive (FIG. 4/STEP 210: YES), an environment confirmation request is transmitted to the remote operation assistance server 10 through the remote wireless communication equipment 222 (FIG. 4/STEP 212).

In the remote operation assistance server 10, when the environment confirmation request is received, the environment confirmation request is transmitted to the corresponding work machine 40 by the first assistance processing element 121 (FIG. 4/C110).

In the work machine 40, when the environment confirmation request is received through the work machine wireless communication equipment 422 (FIG. 4/C410), the work machine control device 400 acquires a picked-up image through the work machine image-pickup device 412 (FIG. 4/STEP 410). Picked-up image data indicating the picked-up image is transmitted to the remote operation apparatus 20 by the work machine control device 400 through the work machine wireless communication equipment 422 (FIG. 4/STEP 412).

In the remote operation assistance server 10, when the picked-up image data is received by the first assistance processing element 121 (FIG. 4/C111), environment image data according to the picked-up image is transmitted to the remote operation apparatus 20 by the second assistance processing element 122 (FIG. 4/STEP 110). The environment image data is, in addition to the picked-up image data itself, image data indicating a simulated environment image generated based on the picked-up image.

In the remote operation apparatus 20, when the environment image data is received through the remote wireless communication equipment 222 (FIG. 4/C210), an environment image corresponding to the environment image data is outputted to the image output device 221 by the remote control device 200 (FIG. 4/STEP 214).

Figure 6:
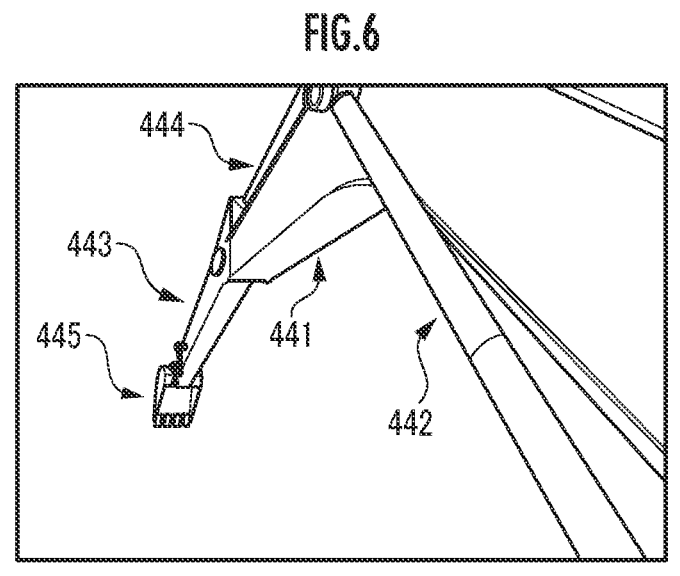

Thereby, for example, as shown in FIG. 6, an environment image with the boom 441, the arm 443 and the bucket 445, which are parts of the work mechanism 440, being reflected therein is outputted to the image output device 221.

In the remote operation apparatus 20, an operation aspect of the remote operation mechanism 211 is recognized by the remote control device 200 (FIG. 4/STEP 216), and a remote operation instruction corresponding to the operation aspect is transmitted to the remote operation assistance server 10 through the remote wireless communication equipment 222 (FIG. 4/STEP 218).

In the remote operation assistance server 10, when the remote operation instruction is received by the second assistance processing element 122, the remote operation instruction is transmitted to the work machine 40 by the first assistance processing element 121 (FIG. 4/C112).

In the work machine 40, when the remote operation instruction is received by the work machine control device 400 through the work machine wireless communication equipment 422 (FIG. 4/C412), operations of the work mechanism 440 and the like are controlled (FIG. 4/STEP 414). Thereby, a remote operation of the work machine 40 is started. For example, work of scooping dirt in front of the work machine 40 by the bucket 445, causing the upper turning body 420 to turn and dropping the dirt from the bucket 445 is executed.

(Second Function)

A second function of the remote operation assistance system in the configuration described before will be described using a flowchart shown in FIG. 5. In the flowchart, each block indicated by "C•" is used to simplify description, means transmission and/or reception of data and means such a conditional branch that processing in a branch direction is executed on condition of transmission and/or reception of the data.

Figure 5:
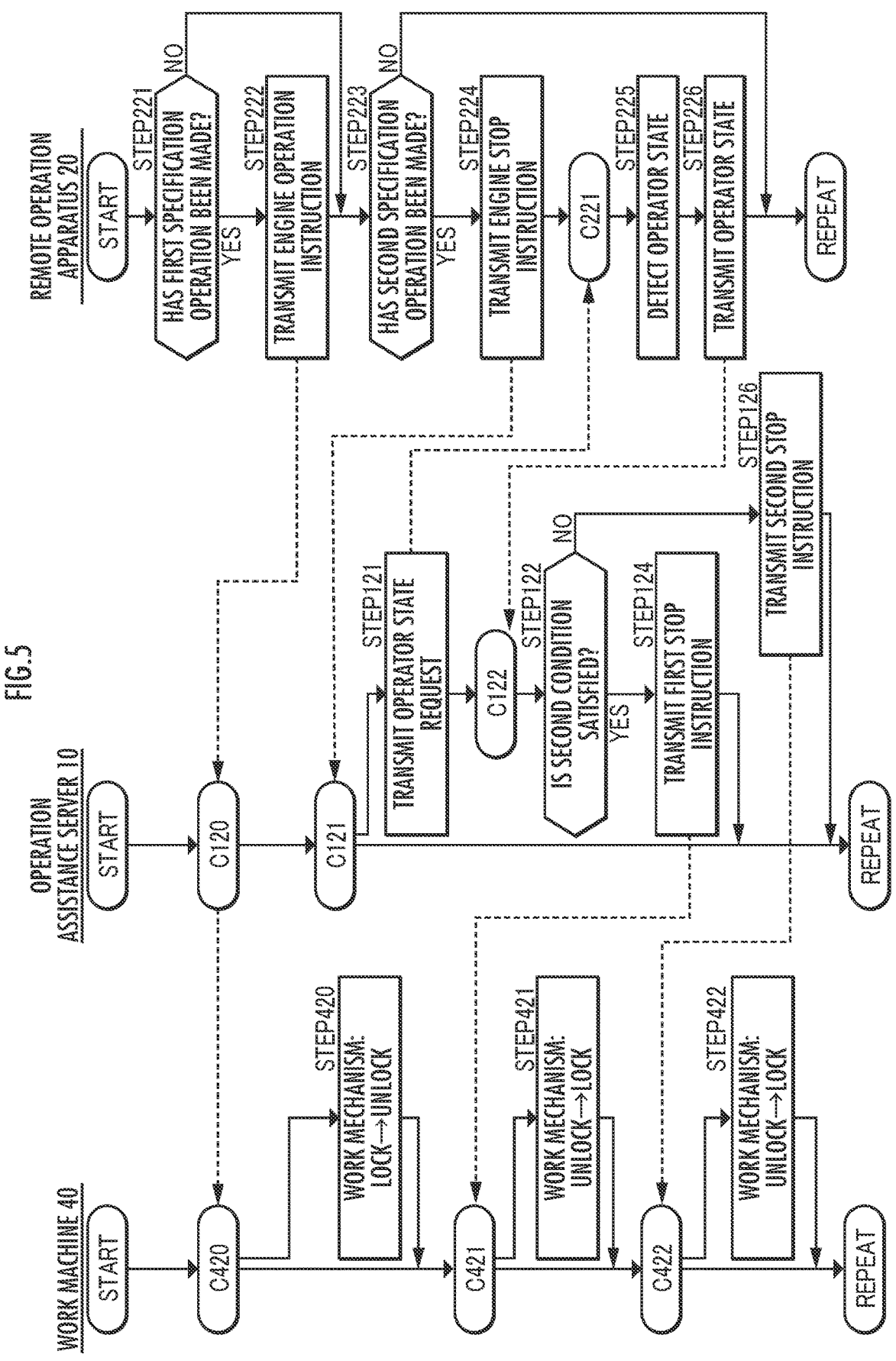
FIG. 5 is a diagram about a second function of the remote operation assistance system.

In the remote operation apparatus 20, it is determined whether a first specification operation through the remote input interface 210 by an operator has been performed or not (FIG. 5/STEP 221). The "first specification operation" is, for example, an operation such as tapping on the remote input interface 210 for causing the engine 460 of the work machine 40 to start, such as switching an IGN switch from OFF to ON. If a result of the determination is negative (FIG. 5/STEP 221: NO), a process after the determination about whether the first specification operation has been performed or not is repeated. On the other hand, if the result of the determination is positive (FIG. 5/STEP 221: YES), an engine operation instruction is transmitted to the remote operation assistance server 10 through the remote wireless communication equipment 222 (FIG. 5/STEP 222). The engine operation instruction includes a work machine identifier for identifying the work machine 40 specified through the remote input interface 210.

In the remote operation assistance server 10, when the engine operation instruction is received, the engine operation instruction is transmitted to the work machine 40 identified by the work machine identifier by the first assistance processing element 121 (FIG. 5/C120).

In the work machine 40, when the engine operation instruction is received through the work machine wireless communication equipment 422 (FIG. 5/C420), the engine 460 of the work machine 40 is switched from OFF to ON by the work machine control device 400, and the work mechanism 440 is switched from a locked state in which operation is impossible to an unlocked state in which operation is possible, according to the operation instruction (FIG. 5/STEP 420). Thereby, for example, the primary pressure oil supplied from the pilot pump can be supplied to a direction control valve as the secondary pressure oil (by the operation aspect of the work machine operation mechanism 411 being adjusted by an actuator) according to the remote operation instruction, and, therefore, the work mechanism 440 is into the state in which operation is possible as described above (see FIG. 4/STEP 216→STEP 218→ . . . →STEP 414, and FIG. 6).

In the remote operation apparatus 20, it is determined whether a second specification operation through the remote input interface 210 by the operator has been performed or not (FIG. 5/STEP 223). The "second specification operation" is, for example, an operation such as tapping on the remote input interface 210 for causing operation of the engine 460 of the work machine 40 to stop, such as switching the IGN switch from ON to OFF. If a result of the determination is negative (FIG. 5/STEP 223: NO), a process after the determination about whether the first specification operation has been performed or not is repeated. On the other hand, if the result of the determination is positive (FIG. 5/STEP 223: YES), an engine stop instruction is transmitted to the remote operation assistance server 10 through the remote wireless communication equipment 222 (FIG. 5/STEP 224). The engine stop operation instruction includes the work machine identifier for identifying the work machine 40 specified through the remote input interface 210.

In the remote operation assistance server 10, when the engine stop instruction is received (FIG. 5/C121), an operator state request is transmitted to the remote operation apparatus 20 by the first assistance processing element 121 (FIG. 5/STEP 121). The engine stop instruction being received is synonymous with the first condition being satisfied.

In the remote operation apparatus 20, when the operator state request is received through the remote wireless communication equipment 222 (FIG. 5/C221), an operator state is detected by the remote control device 200 based on an output signal of the operator state sensor 212 (FIG. 5/STEP 225). For example, whether or not the operator exists at a specified position where the operator should exist at the time of operating the remote operation mechanism 211, such as whether or not the operator is seated on the seat St, is detected as the operator state. Then, the detected operator state is transmitted to the remote operation assistance server 10 through the remote wireless communication equipment 222 (FIG. 5/STEP 226).

When it is determined that the second specification operation has been performed (FIG. 5/STEP 223: YES), the operator state may be detected by the remote control device 200 based on an output signal of the operator state sensor 212 even if the operator state request is not made (FIG. 5/STEP 225), and the detected operator state may be transmitted to the remote operation assistance server 10 together with an engine stop instruction through the remote wireless communication equipment 222 (FIG. 5/STEP 226).

In the remote operation assistance server 10, when the operator state is received (FIG. 5/C122), it is determined by the first assistance processing element 121 whether a second condition is satisfied or not based on the operator state (FIG. 5/STEP 122). That is, it is determined whether or not the operator exists at a specified position where the operator should exist at the time of operating the remote operation mechanism 211.

If a result of the determination is positive, that is, if the first and second conditions are satisfied (FIG. 5/STEP 122: YES), a first stop instruction is transmitted to the work machine 40 by the second assistance processing element 122 (FIG. 5/STEP 124).

In the work machine 40, when the first stop instruction is received through the work machine wireless communication equipment 422 (FIG. 5/C421), the engine 460 of the work machine 40 is kept ON, but the work mechanism 440 is switched from the unlocked state to the locked state, by the work machine control device 400 (FIG. 5/STEP 421). Thereby, supply of the primary pressure oil from the pilot lamp to the work machine operation mechanism 411 is prevented by a corresponding hydraulic circuit being shut off. Therefore, the work mechanism 440 is into the state in which operation is impossible even if a remote operation instruction is made.

If the result of the determination is negative, that is, if the first condition is satisfied but the second condition is not satisfied (FIG. 5/STEP 122: NO), a second stop instruction is transmitted to the work machine 40 by the second assistance processing element 122 (FIG. 5/STEP 126).

In the work machine 40, when the second stop instruction is received through the work machine wireless communication equipment 422 (FIG. 5/C422), the engine 460 of the work machine 40 is switched from ON to OFF, and the work mechanism 440 is switched from the unlocked state to the locked state, by the work machine control device 400 (FIG. 5/STEP 422). Thereby, the primary pressure oil is not supplied from the pilot pump to the work machine operation mechanism 411, and the work mechanism 440 (and the turning mechanism 430) is into the state in which operation is impossible even if the work machine operation mechanism 411 is moved according to a remote operation instruction.

Effect

According to the remote operation assistance server 10 in the above configuration, if the first condition is satisfied, that is, if an engine stop instruction for the work machine 40 has been made through the remote input interface 210 of the remote operation apparatus 20, operation of the engine 460 is stopped in principle, but the operation of the engine 460 is exceptionally not stopped.

Specifically, if the second condition is not satisfied, that is, if the operator exists at the specified position at the time of operating the remote operation mechanism 211 in the remote operation apparatus 20, the probability of the operators intention to cause the engine 460 to stop and, therefore, the operators intention to interrupt a remote operation being reflected on the engine stop instruction is high. Therefore, in this case, the operation of the engine 460 is stopped according to the engine stop instruction, and, thereby, such a situation is certainly avoided that the operation stop state of the work mechanism 440 (including the turning mechanism 430) is accidentally released by a third person other than the operator, and work by the work machine 40 is resumed (see FIG. 5/STEP 122: NO→STEP 126→ . . . STEP 422).

On the other hand, if the second condition is satisfied, that is, if the operator does not exist at the specified position at the time of operating the remote operation mechanism 211 in the remote operation apparatus 20, the probability of the operators intention to cause the engine 460 to stop and, therefore, the operators intention to interrupt the remote operation being reflected on the engine stop instruction is low. Therefore, in this case, the operation of the engine 460 is continued without being stopped even though the engine stop operation instruction has been made, and, thereby, the operation stop state of the work machine 40 is released by the operator in that state, and the work by the work machine 40 can be quickly resumed. Thus, efficiency of work using the work machine 40 can be improved (see FIG. 5/STEP 122: YES→STEP 124→ . . . STEP 421).

OTHER EMBODIMENTS OF THE PRESENT INVENTION

In the above embodiment, it is defined as the second condition that: (a) an operator does not exist at the specified position at the time of operating the remote operation mechanism 211 in the remote operation apparatus 20. As another embodiment, however, at least one of the following may be defined alternatively or additionally as the second condition: an emergency stop switch provided on the remote operation apparatus 20 has been operated; (c) an operation abnormality has occurred in the remote operation apparatus 20, the remote operation assistance server 10 or the work machine 40; and (d) communication disconnection has occurred in the remote operation apparatus 20, the remote operation assistance server 10 or the work machine 40.

The first assistance processing element 121 recognizes satisfiability of the second condition that an operator does not exist at the specified position at the time of operating the remote operation mechanism 211 in the remote operation apparatus 20, based on an output signal from a sensor for detecting that the operator is in contact with or applying a load on a specified structure provided at the specified position in the remote operation apparatus 20.

When the operator is in contact with or applying a load on the specified structure provided at the specified position at the time of operating the remote operation mechanism 211 in the remote operation apparatus 20, the probability of the operator's intension to cause the engine 460 to stop and, therefore, the operator's intension to interrupt a remote operation being reflected on an engine stop instruction is low. Therefore, in this case, the operation of the engine 460 is continued without being stopped even though the engine stop operation instruction has been issued, and, thereby, the operation stop state of the work mechanism is released by the operator in that state, and the work by the work machine 40 can be quickly resumed. Thus, efficiency of work using the work machine can be improved.

The first assistance processing element 121 recognizes the satisfiability of the second condition based on an output signal from the sensor 212 for detecting that the operator is seated on the seat St as the specified structure and applies a load. The first assistance processing element 121 recognizes the satisfiability of the second condition that the operator does not exist at the specified position at the time of operating the remote operation mechanism 211 in the remote operation apparatus 20, based on an output signal from an image-pickup sensor for recognizing a face or facial expression of a person seated on the seat St provided at the specified position in the remote operation apparatus 20.

In the remote operation apparatus 20, when the operator is not seated on the seat St, the probability of the operator's intention to cause the engine to stop and, therefore, the operator's intention to interrupt the remote operation being reflected on the engine stop instruction is low. Therefore, in this case, the operation of the engine 460 is continued without being stopped even though the engine stop operation instruction has been made, and, thereby, the operation stop state of the work machine is released by the operator in that state, and the work by the work machine 40 can be quickly resumed. Thus, efficiency of work using the work machine 40 can be improved.

REFERENCE SIGNS LIST

10 Remote operation assistance server
20 Remote operation apparatus
40 Work machine
41 Work machine input interface
42 Work machine output interface
102 Database
121 First assistance processing element
122 Second assistance processing element
200 Remote control device
210 Remote input interface
211 Remote operation mechanism
212 Operator state sensor
220 Remote output interface
221 Image output device
400 Work machine control device
410 Lower travel body
420 Upper turning body
424 Cab (driver's room)
440 Work mechanism (work attachment)
445 Bucket (work portion)
460 Engine

The invention claimed is:

1. A remote operation assistance system comprising a work machine, a remote operation apparatus for remotely operating the work machine, a remote operation assistance server capable of mutually communicating between the work machine and the remote operation apparatus, the work machine includes:

remote wireless communication equipment which receives a remote operation instruction, an engine operation instruction, a first stop instruction, and a second stop instruction, transmitted from the remote operation assistance server;

an engine which is capable of switching between an ON state in which the engine is started and an OFF state in which the engine is stopped;

a work machine operation mechanism which receives primary pressure oil supplied from a pilot pump in the ON state of the engine;

a hydraulic circuit which supplies the primary pressure oil from the pilot pump to the work machine operation mechanism, and is capable of being shut off;

a direction control valve which receives hydraulic oil supplied from a main pump in the ON state of the engine, and receives secondary pressure oil according to a movement of the work machine operation mechanism corresponding to the remote operation instruction;

a work mechanism which rotatably operates by receiving the hydraulic oil supplied corresponding to operation of the direction control valve via the direction control valve; and

a work machine control device which switches the engine from the OFF state to the ON state in a case where the remote wireless communication equipment receives the engine operation instruction transmitted from the remote operation assistance server, supplies the secondary pressure oil to the direction control valve according to the remote operation instruction by adjusting an operation aspect of the work machine operation mechanism according to the remote operation instruction transmitted from the remote operation assistance server and received by the remote wireless communication equipment, in a case where the remote wireless communication equipment receives the first stop instruction transmitted from the remote operation assistance server, keeps the engine in the ON state and switches the hydraulic circuit supplying the primary pressure oil from an unlocked state in which the hydraulic circuit is not shut off to a locked state in which the hydraulic circuit is shut off, and, in a case where the remote wireless communication equipment receives the second stop instruction transmitted from the remote operation assistance server, switches the engine from the ON state to the OFF state, and switches the hydraulic circuit from the unlocked state to the locked state, the remote operation apparatus includes:

a remote input interface which receives a specification operation by an operator for causing operation of the engine of the work machine to stop;

a remote operation mechanism which is operated by the operator for operating the work machine including the work mechanism;

a seat for the operator to be seated, around which the remote operation mechanism is arranged;

an operator state sensor including at least one of a seat load sensor which is provided on a support member of the seat and detects, in response to an operator state request transmitted from the remote operation assistance server, whether a seat load exists or not, a contact sensor or an operation mechanism load sensor provided on the remote operation mechanism, and an image pickup sensor for recognizing a face or facial expression of a person seated on the seat, the operator state sensor detecting, as an operator state, whether or not the operator is seated and exists on the seat which is a specified position where the operator should exist at a time of operating the remote operation mechanism by the operator, wherein the operator state request is generated by the remote operation assistance server in response to an engine stop instruction; and remote wireless communication equipment which, in a case where the remote input interfaces receives the specification operation, transmits the engine stop instruction to the remote operation assistance server and transmits the operator state detected by the operator state sensor to the remoter operation assistance server, and the remote operation assistance server includes:

a first assistance processing element and a second assistance processing element each comprised of a processor, wherein the first assistance processing element receives the engine stop instruction from the remote operation apparatus and generates the operator state request to transmit the operator state request to the remote operation apparatus, the first assistance processing element recognizes satisfiability of a first condition based on the engine stop instruction transmitted from the remote operation apparatus being received in the remote operation assistance server, determines whether or not the operator exists at the specified position based on the operator state transmitted from the remote operation apparatus, in the remote operation server, and, in a case where a result of determination is that the operator does not exist at the specified position, recognizes satisfiability of a second condition that sets a probability amount indicative of an intention of the operator to cause the engine of the work machine to stop being reflected on the engine stop instruction, and the second assistance processing element executes, in a case where it is recognized by the first assistance processing element that the first and second conditions are satisfied, first stop processing for causing operation of the work mechanism to stop without causing the operation of the engine of the work machine to stop, by causing the work machine control device to keep the engine in the ON state and to switch the hydraulic circuit from the unlocked state to the locked state in which the hydraulic circuit is shut off, by transmitting the first stop instruction to the work machine, based on communication with the work machine, and, the second assistance processing element executes, in a case where it is recognized by the first assistance processing element that the first condition is satisfied but the second condition is not satisfied, second stop processing for causing the operation of each of the work mechanism and the engine of the work machine to stop, by causing the work machine control device to switch the engine to the OFF state and switch the hydraulic circuit from the unlocked state to the locked state, by transmitting the second stop instruction to the work machine, based on communication with the work machine.

2. The remote operation assistance system according to claim 1, wherein the second condition further includes at least any one of the following:

(a) an emergency stop switch provided on the remote operation apparatus has been operated;

(b) an operation abnormality has occurred in the remote operation apparatus, the remote operation assistance server or the work machine; and (c) communication disconnection has occurred in the remote operation apparatus, the remote operation assistance server or the work machine.

3. The remote operation assistance system according to claim 1, wherein the first assistance processing element recognizes the satisfiability of the second condition based on an output signal from the sensor for detecting that the operator is seated on the seat as a specified structure and applies the seat load.

4. A remote operation assistance method for assisting a remote operation of a work machine through a remote operation apparatus using the work machine, the remote operation operation apparatus for remotely operating the work machine, and a remote operation assistance server capable of mutually communicating between the work machine and the remote operation apparatus, the work machine includes:

remote wireless communication equipment which receives a remote operation instruction, an engine operation instruction, a first stop instruction, and a second stop instruction, transmitted from the remote operation assistance server;

an engine which is capable of switching between an ON state in which the engine is started and an OFF state in which the engine is stopped;

a work machine operation mechanism which receives primary pressure oil supplied from a pilot pump in the ON state of the engine;

a hydraulic circuit which supplies the primary pressure oil from the pilot pump to the work machine operation mechanism, and is capable of being shut off;

a direction control valve which receives hydraulic oil supplied from a main pump in the ON state of the engine, and receives secondary pressure oil according to a movement of the work machine operation mechanism corresponding to the remote operation instruction;

a work mechanism which rotatably operates by receiving the hydraulic oil supplied corresponding to operation of the direction control valve via the direction control valve; and a work machine control device which switches the engine from the OFF state to the ON state in a case where the remote wireless communication equipment receives the engine operation instruction transmitted from the remote operation assistance server, supplies the secondary pressure oil to the direction control valve according to the remote operation instruction by adjusting an operation aspect of the work machine operation mechanism according to the remote operation instruction transmitted from the remote operation assistance server and received by the remote wireless communication equipment, in a case where the remote wireless communication equipment receives the first stop instruction transmitted from the remote operation assistance server, keeps the engine in the ON state and switches the hydraulic circuit supplying the primary pressure oil from an unlocked state in which the hydraulic circuit is not shut off to a locked state in which the hydraulic circuit is shut off, and, in a case where the remote wireless communication equipment receives the second stop instruction transmitted from the remote operation assistance server, switches the engine from the ON state to the OFF state, and switches the hydraulic circuit from the unlocked state to the locked state, the remote operation apparatus includes:

a remote input interface which receives a specification operation by an operator for causing operation of the engine of the work machine to stop;

a remote operation mechanism which is operated by the operator for operating the work machine including the work mechanism;

a seat for the operator to be seated, around which the remote operation mechanism is arranged;

an operator state sensor including at least one of a seat load sensor which is provided on a support member of the seat and detects, in response to an operator state request transmitted from the remote operation assistance server, whether a seat load exists or not, a contact sensor or an operation mechanism load sensor provided on the remote operation mechanism, and an image pickup sensor for recognizing a face or facial expression of a person seated on the seat, the operator state sensor detecting, as an operator state, whether or not the operator is seated and exists on the seat which is a specified position where the operator should exist at a time of operating the remote operation mechanism by the operator, wherein the operator state request is generated by the remote operation assistance server in response to an engine stop instruction; and remote wireless communication equipment which, in a case where the remote input interfaces receives the specification operation, transmits the engine stop instruction to the remote operation assistance server and transmits the operator state detected by the operator state sensor to the remoter operation assistance server, and the remote operation assistance server includes:

a first assistance processing element and a second assistance processing element each comprised of a processor, the remote operation assistance method comprising:

a step of receiving the engine stop instruction from the remote operation apparatus and generating the operator state request to transmit the operator state request to the remote operation apparatus, a first assistance processing step of executing, by the first assistance processing element, processing for recognizes satisfiability of a first condition based on the engine stop instruction transmitted from the remote operation apparatus being received in the remote operation assistance server, determines whether or not the operator exists at the specified position based on the operator state transmitted from the remote operation apparatus, in the remote operation server, and, in a case where a result of determination is that the operator does not exist at the specified position, recognizes satisfiability of a second condition that sets a probability amount indicative of an intention of the operator to cause the engine of the work machine to stop being reflected on the engine stop instruction, and a second assistance processing step of executing, by the second assistance processing element, in a case where it is recognized by the first assistance processing element that the first and second conditions are satisfied, first stop processing for causing operation of the work mechanism to stop without causing the operation of the engine of the work machine to stop, by causing the work machine control device to keep the engine in the ON state and to switch the hydraulic circuit from the unlocked state to the locked state in which the hydraulic circuit is shut off, by transmitting the first stop instruction to the work machine, based on communication with the work machine, and, the second assistance processing element executes, in a case where it is recognized by the first assistance processing element that the first condition is satisfied but the second condition is not satisfied, second stop processing for causing the operation of each of the work mechanism and the engine of the work machine to stop, by causing the work machine control device to switch the engine to the OFF state and switch the hydraulic circuit from the unlocked state to the locked state, by transmitting the second stop instruction to the work machine, based on communication with the work machine.

5. A remote operation assistance server capable of mutually communicating between a work machine and a remote operation apparatus for remotely operating the work machine, the work machine includes:

remote wireless communication equipment which receives a remote operation instruction, an engine operation instruction, a first stop instruction, and a second stop instruction, transmitted from the remote operation assistance server;

an engine which is capable of switching between an ON state in which the engine is started and an OFF state in which the engine is stopped;

a work machine operation mechanism which receives primary pressure oil supplied from a pilot pump in the ON state of the engine;

a hydraulic circuit which supplies the primary pressure oil from the pilot pump to the work machine operation mechanism, and is capable of being shut off;

a direction control valve which receives hydraulic oil supplied from a main pump in the ON state of the engine, and receives secondary pressure oil according to a movement of the work machine operation mechanism corresponding to the remote operation instruction;

a work mechanism which rotatably operates by receiving the hydraulic oil supplied corresponding to operation of the direction control valve via the direction control valve; and a work machine control device which switches the engine from the OFF state to the ON state in a case where the remote wireless communication equipment receives the engine operation instruction transmitted from the remote operation assistance server, supplies the secondary pressure oil to the direction control valve according to the remote operation instruction by adjusting an operation aspect of the work machine operation mechanism according to the remote operation instruction transmitted from the remote operation assistance server and received by the remote wireless communication equipment, in a case where the remote wireless communication equipment receives the first stop instruction transmitted from the remote operation assistance server, keeps the engine in the ON state and switches the hydraulic circuit supplying the primary pressure oil from an unlocked state in which the hydraulic circuit is not shut off to a locked state in which the hydraulic circuit is shut off, and, in a case where the remote wireless communication equipment receives the second stop instruction transmitted from the remote operation assistance server, switches the engine from the ON state to the OFF state, and switches the hydraulic circuit from the unlocked state to the locked state, the remote operation apparatus includes:

a remote input interface which receives a specification operation by an operator for causing operation of the engine of the work machine to stop;

a remote operation mechanism which is operated by the operator for operating the work machine including the work mechanism;

a seat for the operator to be seated, around which the remote operation mechanism is arranged;

an operator state sensor including at least one of a seat load sensor which is provided on a support member of the seat and detects, in response to an operator state request transmitted from the remote operation assistance server, whether a seat load exists or not, a contact sensor or an operation mechanism load sensor provided on the remote operation mechanism, and an image pickup sensor for recognizing a face or facial expression of a person seated on the seat, the operator state sensor detecting, as an operator state, whether or not the operator is seated and exists on the seat which is a specified position where the operator should exist at a time of operating the remote operation mechanism by the operator, wherein the operator state request is generated by the remote operation assistance server in response to an engine stop instruction; and remote wireless communication equipment which, in a case where the remote input interfaces receives the specification operation, transmits the engine stop instruction to the remote operation assistance server and transmits the operator state detected by the operator state sensor to the remoter operation assistance server, and the remote operation assistance server includes:

a first assistance processing element and a second assistance processing element each comprised of a processor, wherein the first assistance processing element receives the engine stop instruction from the remote operation apparatus and generates the operator state request to transmit the operator state request to the remote operation apparatus, the first assistance processing element recognizes satisfiability of a first condition based on the engine stop instruction transmitted from the remote operation apparatus being received in the remote operation assistance server, determines whether or not the operator exists at the specified position based on the operator state transmitted from the remote operation apparatus, in the remote operation server, and, in a case where a result of determination is that the operator does not exist at the specified position, recognizes satisfiability of a second condition that sets a probability amount indicative of an intention of the operator to cause the engine of the work machine to stop being reflected on the engine stop instruction, and the second assistance processing element executes, in a case where it is recognized by the first assistance processing element that the first and second conditions are satisfied, first stop processing for causing operation of the work mechanism to stop without causing the operation of the engine of the work machine to stop, by causing the work machine control device to keep the engine in the ON state and to switch the hydraulic circuit from the unlocked state to the locked state in which the hydraulic circuit is shut off, by transmitting the first stop instruction to the work machine, based on communication with the work machine, and, the second assistance processing element executes, in a case where it is recognized by the first assistance processing element that the first condition is satisfied but the second condition is not satisfied, second stop processing for causing the operation of each of the work mechanism and the engine of the work machine to stop, by causing the work machine control device to switch the engine to the OFF state and switch the hydraulic circuit from the unlocked state to the locked state, by transmitting the second stop instruction to the work machine, based on communication with the work machine.

* * * * *